J. E. SHELTON.
Churn-Dashers.
No. 149,161. Patented March 31, 1874.
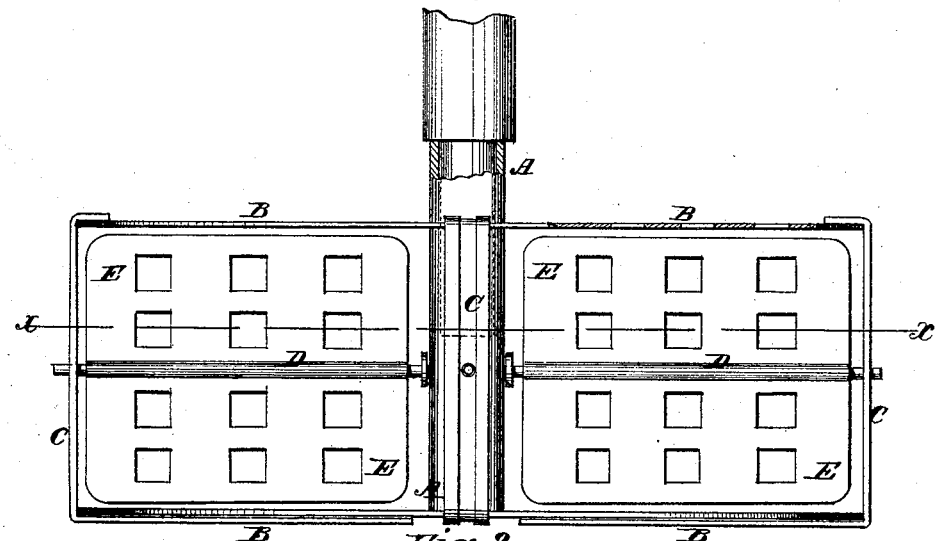
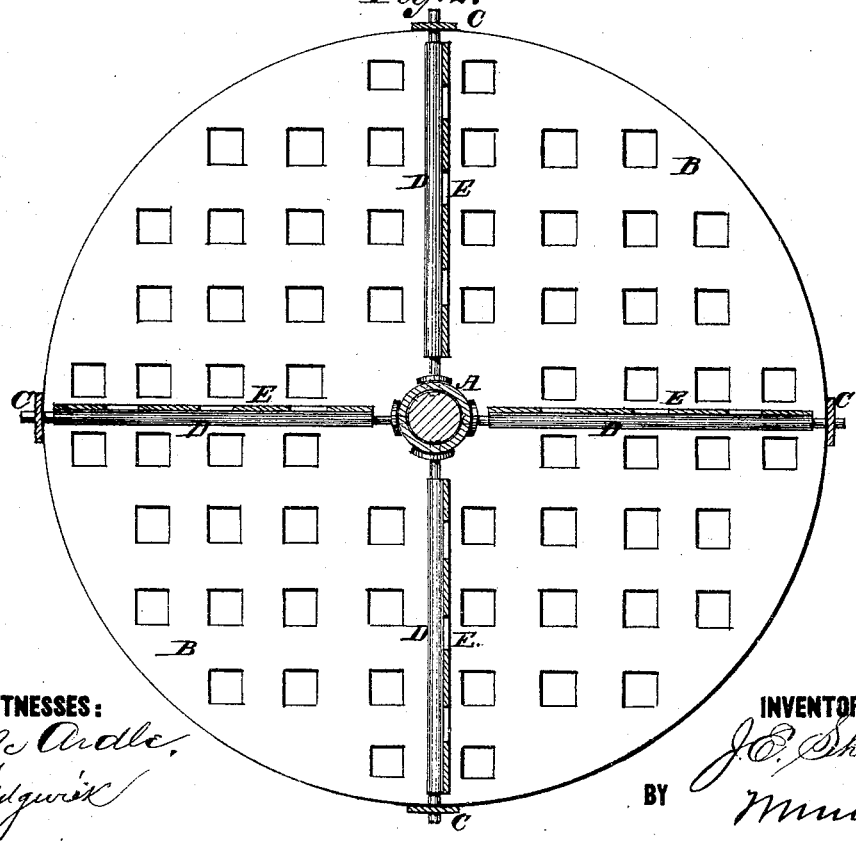
WITNESSES:
INVENTOR:
BY
ATTORNEYS.

UNITED STATES PATENT OFFICE

JOHN E. SHELTON, OF HICKMAN'S MILLS, MISSOURI.

IMPROVEMENT IN CHURN-DASHERS.

Specification forming part of Letters Patent No. 149,161, dated March 31, 1874; application filed February 21, 1874.

*To all whom it may concern:*

Be it known that I, JOHN E. SHELTON, of Hickman's Mills, in the county of Jackson and State of Missouri, have invented a new and useful Improvement in Churn-Dasher, of which the following is a specification:

Figure 1 is a side view of my improved churn-dasher. Figure 2 is a horizontal section of the same taken through the line $x\ x$, Fig. 1.

Similar letters of reference indicate corresponding parts.

My invention has for its object to furnish an improved churn-dasher which shall be simple in construction, light, strong, easily cleaned, and effective in operation, bringing the butter quickly and thoroughly. The invention consists in an improved churn-dasher formed of the short tube, the two perforated disks, the connecting-strips, and the pivoted, perforated radial plates, said parts being constructed and arranged in connection with each other, as hereinafter fully described.

A is a short vertical tube, in which the lower end of the dasher-handle is secured. To the tube A, a little distance apart, are secured two parallel disks, B, in which are formed numerous small square holes. The outer edges of the disks B are connected by short vertical bars or strips C, which hold the disks B in their proper relative position, and greatly strengthen the dasher. To the center of the strips C, and to the tube A, are pivoted the ends of horizontal radial rods D, to which are secured the plates E, which are made of such a size as to turn freely between the disks B. The plates or wings E are also perforated with numerous small square holes, as shown in Fig. 1.

With the dasher thus constructed, the milk is finely divided, and is thrown into numerous currents and counter-currents, bringing the butter in a very short time, and developing all the butter there may be in the milk.

Having thus described my invention, I claim as new and desire to secure by Letters Patent—

An improved churn-dasher formed of the short tube A, the two perforated disks B, the connecting-strips C, and the pivoted, perforated, radial plates D E, said parts being constructed and arranged in connection with each other, substantially as herein shown and described.

JOHN E. SHELTON.

Witnesses:
THOMAS W. TODD,
JAS. B. PARRISH.